(12) United States Patent
Baratin

(10) Patent No.: US 9,096,114 B2
(45) Date of Patent: Aug. 4, 2015

(54) EXTERIOR TRIM FOR MOTOR VEHICLE DOOR FRAME, AND SEALING MODULE INCORPORATING SAME

(75) Inventor: Sylvain Baratin, Corquilleroy (FR)

(73) Assignee: Hutchinson, Corquilleroy (FR)

( * ) Notice: Subject to any disclaimer, the term of this patent is extended or adjusted under 35 U.S.C. 154(b) by 663 days.

(21) Appl. No.: 13/022,076

(22) Filed: Feb. 7, 2011

(65) Prior Publication Data

US 2011/0204671 A1 Aug. 25, 2011

(30) Foreign Application Priority Data

Feb. 8, 2010 (FR) ...................................... 10 00506

(51) Int. Cl.
*B60J 10/00* (2006.01)
*B60J 10/08* (2006.01)
*B60J 10/04* (2006.01)

(52) U.S. Cl.
CPC .......... *B60J 10/0051* (2013.01); *B60J 10/0022* (2013.01); *B60J 10/042* (2013.01); *B60J 10/08* (2013.01)

(58) Field of Classification Search
CPC ........ B60J 10/022; B60J 10/042; B60J 10/08; B60J 10/0051
USPC ....................... 296/1.08, 93, 146.5
See application file for complete search history.

(56) References Cited

U.S. PATENT DOCUMENTS

| 5,740,640 | A | * | 4/1998 | Yasuda | ..................... 52/204.597 |
| 5,743,047 | A | * | 4/1998 | Bonne et al. | ................. 49/490.1 |
| 5,806,247 | A | | 9/1998 | Yamamoto | |
| 6,070,363 | A | * | 6/2000 | Vance | .............................. 49/377 |
| 6,260,254 | B1 | | 7/2001 | Mueller et al. | |
| 7,325,859 | B1 | | 2/2008 | Brancaleone et al. | |
| 8,479,449 | B2 | * | 7/2013 | Titz | ................................ 49/440 |
| 2006/0138801 | A1 | | 6/2006 | Hashimoto et al. | |
| 2008/0122251 | A1 | | 5/2008 | Okajima et al. | |

FOREIGN PATENT DOCUMENTS

| DE | 34 42 241 A1 | 5/1986 |
| DE | 199 40 316 A1 | 5/2001 |
| EP | 0 654 371 A1 | 5/1995 |
| EP | 1 232 887 B1 | 8/2002 |
| GB | 2 429 027 A | 2/2007 |

OTHER PUBLICATIONS

Preliminary Search Report for French Application No. 1000506 dated Dec. 1, 2010.

* cited by examiner

*Primary Examiner* — Glenn Dayoan
*Assistant Examiner* — Melissa A Black
(74) *Attorney, Agent, or Firm* — Alston & Bird LLP

(57) ABSTRACT

The present invention relates to an exterior trim for a frame of a glazed side or rear door of a motor vehicle and to a sealing module incorporating it. The invention notably applies to sealing modules for exterior glass run channel profile strips for doors with hidden frames used in motor vehicles. This exterior trim (40''') can be attached directly to a rebate(21''') of the frame and is intended to hold on this frame at least one sealing profile strip of the run channel type (10) and a double lip seal (50) for sealing against the bodyshell, the trim comprising a portion (41) for clamping onto the rebate which has a substantially U-shaped cross section with two longitudinal axial legs (42''' and 43'''). According to the invention, a plurality of male and/or female catching means (43a''') are formed spaced along the length of at least one of said legs, or catching leg (43''') facing the other leg (42''') and are designed to cooperate respectively with a plurality of complementary female and/or male catching elements (21a''') formed spaced along the length of said rebate.

17 Claims, 15 Drawing Sheets

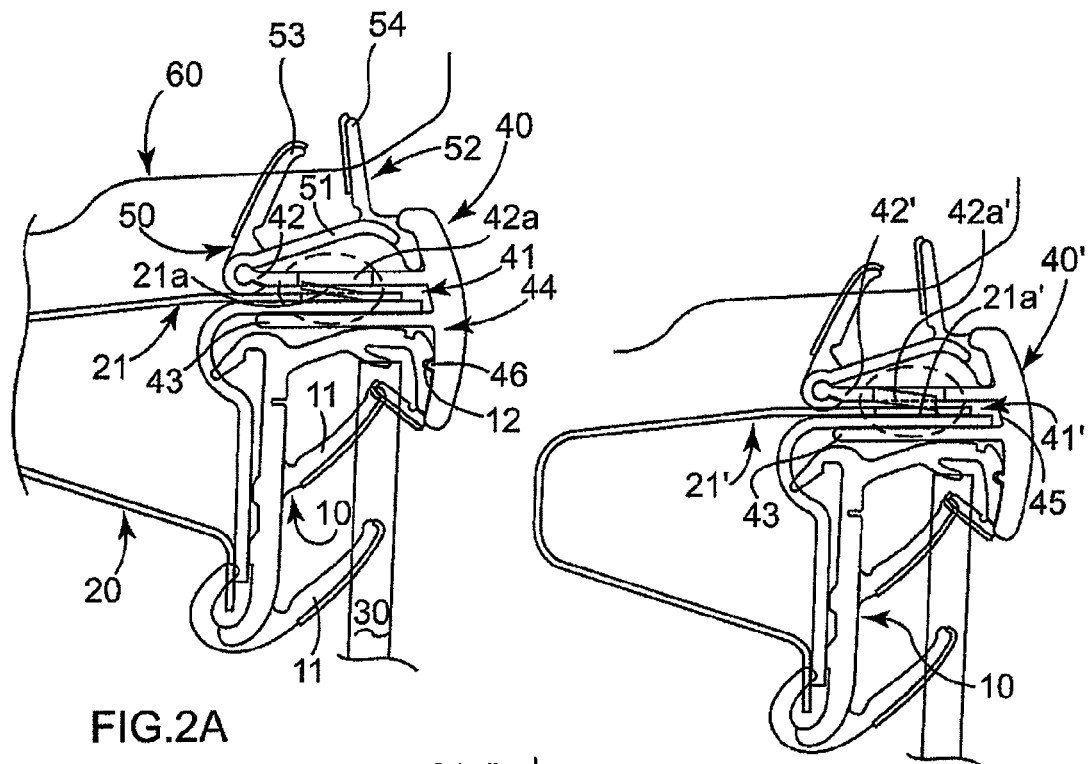
FIG.2A
FIG.2B
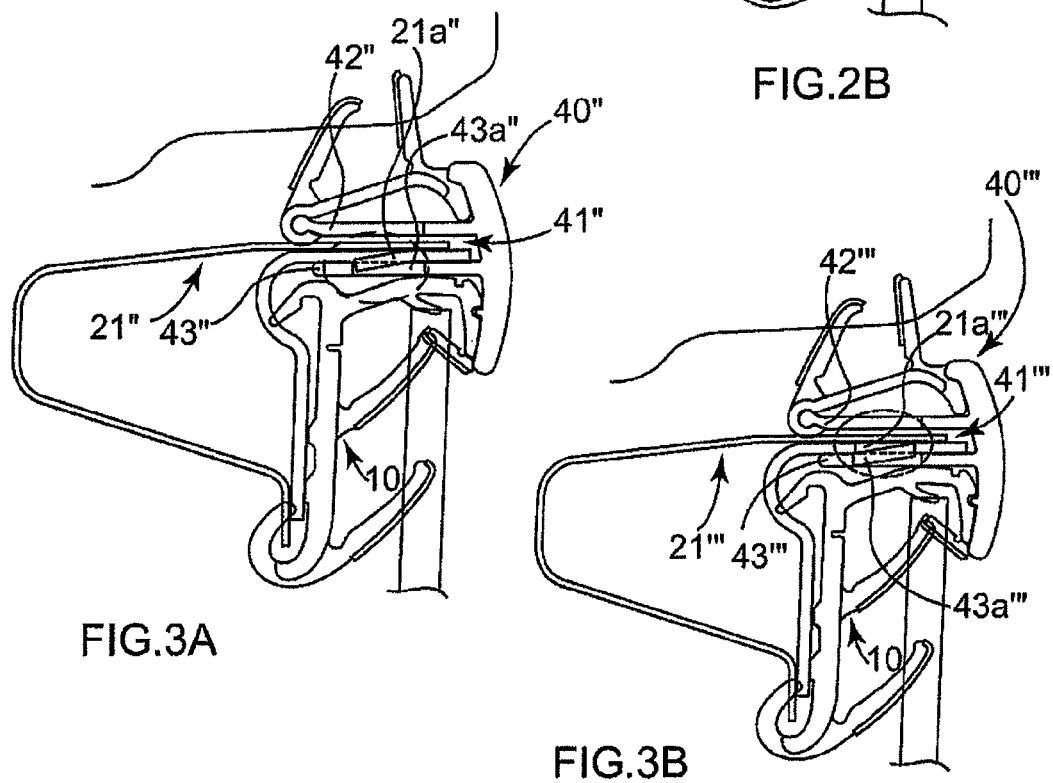
FIG.3A
FIG.3B

EXTERIOR TRIM FOR MOTOR VEHICLE DOOR FRAME, AND SEALING MODULE INCORPORATING SAME

FIELD OF THE INVENTION

The present invention relates to an exterior trim for a frame of a glazed side or rear door of a motor vehicle and to a sealing module incorporating it. The invention notably applies to sealing modules for exterior glass run channel profile strips for doors with hidden frames used in motor vehicles.

BACKGROUND

In a known way, exterior trims fitted to sealing profile strips of the run channel or window sealing strip type for the mobile glazing of a motor vehicle perform a function of decorating or improving the appearance of the sealing profile strips that they cover and these trims, like the sealing profile strips that accept them, are generally made of rigid profile strips (typically made of metal or, by way of alternative, of a rigid or semi-rigid thermoplastic material, the latter then including a reinforcing structure) which are assembled onto the corresponding profile strips. These exterior trims can be attached to the bodyshell of the vehicle, in which case they are called "gutters" or double lip seal against bodyshell, or alternatively to a door of the vehicle, they in this case being exterior door frame trims, whether these be vertical or horizontal. Among such glass run channel exterior trims for hidden frame doors a distinction is usually made, in the case of the extruded profile strips, between:

- a first family which includes trims which are attached directly to the rebate of the door frame and to which the glass run channel and the double lip seal portion are added,
- a second family which includes trims which are attached to the door frame and which also pass through the sealing profile strip which acts as a double lip seal and a glass run channel, and
- a third family which includes trims which are attached to the profile strip that forms the glass run channel, but without making direct contact with the door frame.

Exterior trims in this first family are usually extruded metal held on the rebate of the door frame by added metal clamps, screws or pop rivets. A major disadvantage with these trims is that they often require re-machining or rework operations (bending to shape the ends, curving to follow the curvature of the frame, molding to sort out the ends if these ends are not bendable in the case of steel), the addition of end fittings and finally machining to prepare regions at which these clips can be fitted.

Other disadvantages with known trims from this first family lie in the surface treatment and/or painting operation (for the "full gloss" black appearance), depending on the appearance desired: chrome, full gloss black, matt, gun metal, etc., in their high cost of manufacture, in the use of aluminum or stainless steel to avoid corrosion (the latter material in fact being very difficult to bend at the ends), in their relatively high weight, and even in the need to bond the trim if its shape evolves over its length.

Document EP-B1-1 232 887 discloses an exterior trim for a door with hidden frame which is injection molded from a thermoplastic material and has a cross section substantially in the shape of a T and is for example force-fitted via a U-shaped clamping portion that it includes onto a flat door frame rebate. This rebate may terminate in an arrowhead-shaped axially external end.

The trim described in that document has the notable disadvantage of being difficult to mold because of the small dimensions and continuity of its U-shaped clamping portion. Another disadvantage with this trim is that it is unable by itself to support the double lip seal profile strip for sealing against the bodyshell with which strip it is simply in contact.

SUMMARY OF THE INVENTION

It is an object of the present invention to propose an exterior trim for a frame of a glazed side or rear door of a motor vehicle which is able to overcome these disadvantages, the trim being able to be attached directly to a rebate of the frame and being intended to hold on this frame at least one sealing profile strip of the glass run channel type and a double lip seal for sealing against this bodyshell, this trim comprising a portion for clamping onto the rebate which has a substantially U-shaped cross section with two longitudinal axial legs.

To this end, a trim according to the invention is such that a plurality of male and/or female catching means are formed spaced along the length of at least one of said legs, or catching leg facing the other leg and are designed to cooperate respectively with a plurality of complementary female and/or male catching elements formed spaced along the length of said rebate.

It will be noted that a trim according to the invention thus defined may be fitted in the overall Y direction (axial direction) of the vehicle that is to accept it via the upper rebate of its relevant door frame.

Advantageously, said catching means may comprise parts projecting toward said other leg and/or recessed or hollowed parts, these catching means being formed somewhere short of the axially inner free end of said catching leg.

According to another feature of the invention, said trim comprises an axially outer bearing portion comprising the web of said U-shaped clamping portion and extending it at least on one of its sides, or glass run channel side, via which the trim is intended to bear against said glass run channel profile strip, preferably via at least one longitudinal bearing lug extending axially inward and designed to engage in a corresponding axial recess of this profile strip.

Advantageously, said bearing portion may further extend said web on an opposite side to said glass run channel side, or double lip seal side, via which the trim is intended to bear against said double lip seal profile strip, this trim having substantially the shape of a "π" in cross section.

According to another feature of the invention, said bearing portion and at least said other leg may be single-shot or multi-shot injection molded from one or more thermoplastic materials chosen from the group consisting of filled materials based on thermoplastic material polymers, thermoplastic material elastomers (TPEs) and mixtures thereof, and preferably based on a polypropylene, optionally filled with talc or with glass fibers, or alternatively based on an acrylonitrile-butadiene-styrene (ABS) terpolymer optionally mixed with a polypropylene or with a polycarbonate (PC).

Advantageously, said bearing portion may have an axially exterior fair face consisting of at least one layer of a film and/or of a metal foil which is added on, for example by bonding or clipping, or is alternatively formed as one piece with said bearing portion by overmolding or multi-shot injection molding.

As an alternative, the fair face of the bearing portion may be obtained by a catalytic chrome plating bath or by painting.

According to a first embodiment of the invention, said trim is molded by single-shot or multi-shot injection molding with one or more thermoplastic materials which forms(form) said catching leg, said other leg and an axially external bearing portion joining them together, this trim being formed as one piece over a given cross section.

According to this first embodiment of the invention, said two legs may be:

both continuous over the length of the trim, or alternatively both discontinuous over the length thereof, being formed of a plurality of leg sections arranged in a staggered configuration for these two legs, the sectors of said catching leg each having one of said catching means.

Again according to this first embodiment, said catching means may comprise a plurality of obliquely projecting tabs, for example rectangular tabs, which are formed spaced apart over the face of said catching leg facing said other leg and which are respectively designed to collaborate by snap-fastening with cavities (blind cavities or through cavities) of said rebate forming said catching elements, or alternatively a plurality of cavities (blind cavities or through cavities) for example rectangular cavities formed spaced apart through said catching leg and which are intended to be filled by snap-fastening by obliquely projecting tabs forming said catching elements on the opposing face of said rebate.

According to a second embodiment of the invention, said trim comprises:

an external trim body with a cross section substantially in the shape of an asymmetric L or T, this body having a bearing portion which forms the base of the L or the top of the T and which is intended to hold said glass run channel profile strips and double lip seal profile strips in place and a single leg intended to receive this double lip seal profile strip, and a plurality of plastic or metal clips which are immobilized in a spaced apart manner against and inside the trim body along the length thereof and which have an upper branch and a lower branch together defining a clamp clamping onto said rebate, said lower branch defining said catching leg of the trim which, in relation with the leg of the trim body forms said clamping portion of the trim.

According to this second embodiment of the invention, said upper branch of the clamp formed by each clip defines a holding region holding the latter in abutment in said trip body, this holding region being substantially parallel to said leg of this trim body.

Again according to this second embodiment, said lower branch of each clip has a protruding catching part which curves in toward said leg of the trim body and is intended to become wedged in a cavity of said rebate, which is preferably a through-cavity.

With reference to these two embodiments of the invention, it will be noted that a trim according to the invention is able to address the aforementioned disadvantages of the prior art relating to the weight, the cost of manufacture and the appearance of existing trims of the aforementioned first family. This trim may have varying appearances according to how it is produced, for example a chrome finish, a full gloss black finish, a matt black finish, etc.

Because this door trim is advantageously injection molded, it can adopt a varying geometry, varying longitudinally or laterally, particularly on its visible face, and may be broken down into one or more pieces on the vertical or upper members of the front or rear side door frames, namely on the upright of the opening or "A-pillar" on the front upper frame (front or rear "B-pillar") and on the rear door upper frame or "C-pillar".

This trim according to the invention may also be able to retain the double lip seal profile strip, whether the latter is manufactured by extrusion or injection molding (single-shot or multiple shot) by being attached to the trim or alternatively whether it is incorporated directly into the trim for example by co-injection molding or multi-shot injection molding.

In addition to its appearance function, such a trim according to the invention may also serve to hold the run channel profile strip or strips in combination or otherwise with said door frame rebate. One or more of these glass run channel profile strips which provide sealing between the door frame (via the trim) and the window may be:

one or more extruded profile strips added between the trim and the door frame, or alternatively at least one extruded or injection molded sealing lip which is intended to press against the door glazing and which is caught on a protruding lower edge of the trim, for example of ball, bull-nose or harpoon shape, via a C-shaped catching region of said at least one lip, or alternatively at least one sealing lip which is intended to press against the glazing of said door and which is connected as a single piece to a lower edge of the trim, preferably via overmolding or co-injection molding with the trim.

A sealing module according to the invention comprises:

an exterior trim for the frame of a glazed side or rear door of a motor vehicle as defined hereinabove, the trim being able to be attached directly to a rebate of the frame and being intended to hold on this frame at least one sealing profile strip of the glass run channel type, and the rebate which comprises said plurality of female and/or male catching elements formed spaced along the length and designed to cooperate with said plurality of complementary male and/or female catching means formed along the length of said at least one catching leg.

According to another aspect of the invention, this sealing module is of the type further comprising a double lip seal profile strip comprising a rigid base which is intended to be in contact with the trim, and a sealing part, for example of the type having lip(s) and/or of the tube type which is intended to seal against the fixed frame of the bodyshell. According to the invention, this double lip seal profile strip may advantageously be secured to the trim at at least one region of mechanical attachment or of adhesion between said rigid base and the one of said legs, or proximal leg, which is adjacent to this base.

According to one example of the invention, said mechanical catching region is formed at the respective axially internal ends of said rigid base and of said proximal leg and is formed by the bent-back axially internal end of this base which catches on a relief, for example a bead of circular or oblong section or alternatively of harpoon or arrowhead type.

According to an alternative form of the invention, said double lip seal profile strip is secured to the trim at two mechanical catching regions respectively formed by two axially internal and external lugs which are continuous or discontinuous, which lugs extend substantially at right angles from that face of said proximal leg which faces toward this profile strip and are then bent back away from one another so that this leg equipped with these lugs substantially forms an inverted "π" in cross section, these two lugs being caught by the axially internal and external ends, which are bent toward one another, of said rigid base which is substantially in the shape of a "∩" in cross section.

According to another alternative form of the invention, said double lip seal profile strip is secured to the trim by an adhesive bond obtained preferably by co-injection molding of the materials of which this profile strip is made with that or those of said proximal leg.

According to another feature of the invention, said rigid base of said double lip seal profile strip may rest substantially flat against said proximal leg of the trim, or alternatively diverge progressively from this leg starting from its axially internal end as far as its axially external end, against which the trim is mounted, said profile strip preferably being molded as a multi-shot injection molding of thermoplastic materials.

It will be noted that this mounting of the double lip seal profile strip flat on the trim gives the sealing module according to the invention greater compactness and that on the other hand, mounting this profile strip with this progressive spacing makes it possible to fill the space between the door frame (via the trim) and the fixed frame member formed by the side of the bodyshell.

BRIEF DESCRIPTION OF THE DRAWINGS

Other features, advantages and details of the present invention will become apparent from reading the following description of a number of embodiments of the invention, which are given by way of nonlimiting illustration, said description being given with reference to the accompanying drawings, in which:

FIGS. 2A and 2B are views in cross section of two sealing modules according to the invention, each one comprising a trim according to said first embodiment mounted on the rebate of the door frame in two different examples of how the catching means and elements formed on an upper leg of the trim and on this rebate cooperate, FIGS. 3A and 3B are views in cross section of two other sealing modules according to this first embodiment of the invention with two other examples of how catching means and elements formed on a lower leg of the trim and on the rebate cooperate.

DETAILED DESCRIPTION

In what follows, the qualifiers "axially internal" and "axially external" will be used in the usual way to denote the position of an element of the sealing module toward the inside and toward the outside, respectively, in the axial direction Y of the width of the vehicle (this transverse horizontal direction Y being, by definition, perpendicular to the plane XZ defined by the is longitudinal horizontal X and vertical directions).

Figure 1:
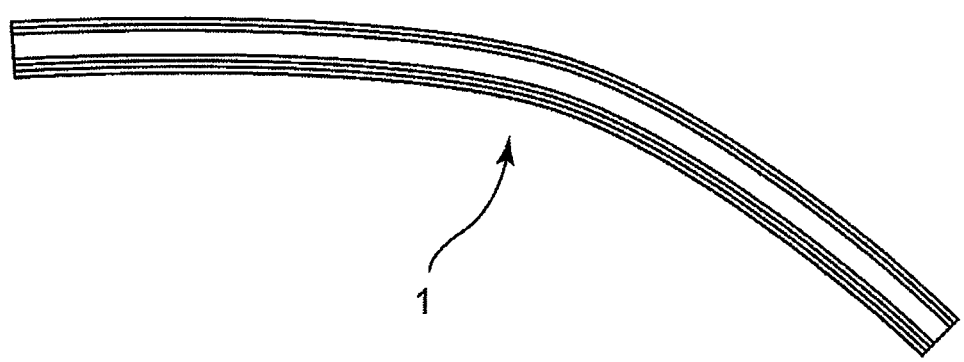
FIG. 1 is a schematic front view of an exterior trim according to the invention for a glass run channel with hidden frame of a motor vehicle side door frame.

The module 1 visible in the example of FIG. 1 is, for example, mounted on the rear side door of the vehicle and further incorporates a double lip seal profile strip for sealing against the bodyshell.

As can be seen in FIGS. 2A, 2B, 3A, 3B and 4A, a sealing module 1 according to the first embodiment of the invention comprises:

- at least one sealing profile strip 10 forming an exterior run channel of the U-shaped type for a door with a hidden frame 20, which is intended to press elastically against the two faces of a glazing 30 of the door via flexible sealing lips 11 (preferably made of a single-substance or multi-substance elastomer material),
- an exterior trim 40, 40', 40", 40''' of the frame 20, injection molded in one or more thermoplastic material(s), which is attached to an upper rebate 21, 21', 21'', 21''' of the frame 20 and which holds this glass run channel profile strip 10 on this frame 20, this trim being substantially in the shape of a "π" in cross section and essentially comprising, on the one hand, a clamping portion 41, 41', 41", 41''' of U-shaped cross section with two longitudinal axial legs 42, 42', 42", 42''' and 43, 43", 43''', for clamping onto the rebate and, on the other hand, an axially outer bearing portion 44 comprising the web 45 of the clamping portion 41 to 41''' and extending it on its two sides, and
- a double lip seal profile strip 50 for sealing against the fixed frame of the bodyshell 60, which comprises a rigid base 51 intended to be in contact with the trim 40 and a sealing part 52 (in this example of the type having lips 53 and 54) intended to seal against this fixed frame 60, and which is also held on the door frame 20 by the trim 40.

More specifically, the bearing portion 44 of the trim 40 to 40''' presses against the glass run channel profile strip 10 for example via a longitudinal lug 46 extending axially inward and designed to engage in a corresponding axial recess 12 of this profile strip 10 and this bearing portion 44 also presses against the double lip seal profile strip 50.

In the example of FIG. 2A, the upper leg 42 of the trim 40 has, between its axially internal and external ends, means of catching on the rebate, these means consisting of rectangular cavities 42a which are formed at regular or irregular intervals along the length of the trim 40 and into which can be snap-fastened tabs 21a which protrude obliquely upward and are formed in the manner of rectangular lancings along the length of the rebate 21.

In the example of FIG. 2B, the upper leg 42' of the trim 40' has means of catching on the rebate 21', these means consisting of oblique rectangular tabs 42a' protruding obliquely downward and which are formed at regular or irregular intervals along the length of the trim 40' between the axially internal and external ends of this leg 42' and which snap-fastened into rectangular cavities 21a' formed along the length of the rebate 21'.

In the example of FIG. 3A, the lower leg 43" of the trim 40" has, between its axially internal and external ends, means of catching on the rebate 21", these means consisting of rectangular cavities 43a" which are formed at regular or irregular intervals along the length of the trim 40" and into which can be snap-fastened rectangular tabs 21a" which protrude obliquely downward and are formed along the length of the rebate 21" (it is possible to elect to form these rebate tabs 21a or 21a" upward as in FIG. 2A or downward as in this FIG. 3A according to the required compactness in the immediate geometric vicinity of the door frame 20).

In example of FIG. 3B, the lower leg 43" of the trim 40''' has means of catching on the rebate 21" which consist of rectangular oblique tabs 43a''' protruding obliquely upward and formed at regular or irregular intervals along the length of the trim 40''' between the axially internal and external ends of this leg 43" and which snap-fasten into rectangular cavities 21a" formed along the length of the rebate 21'''.

Figure 4A:
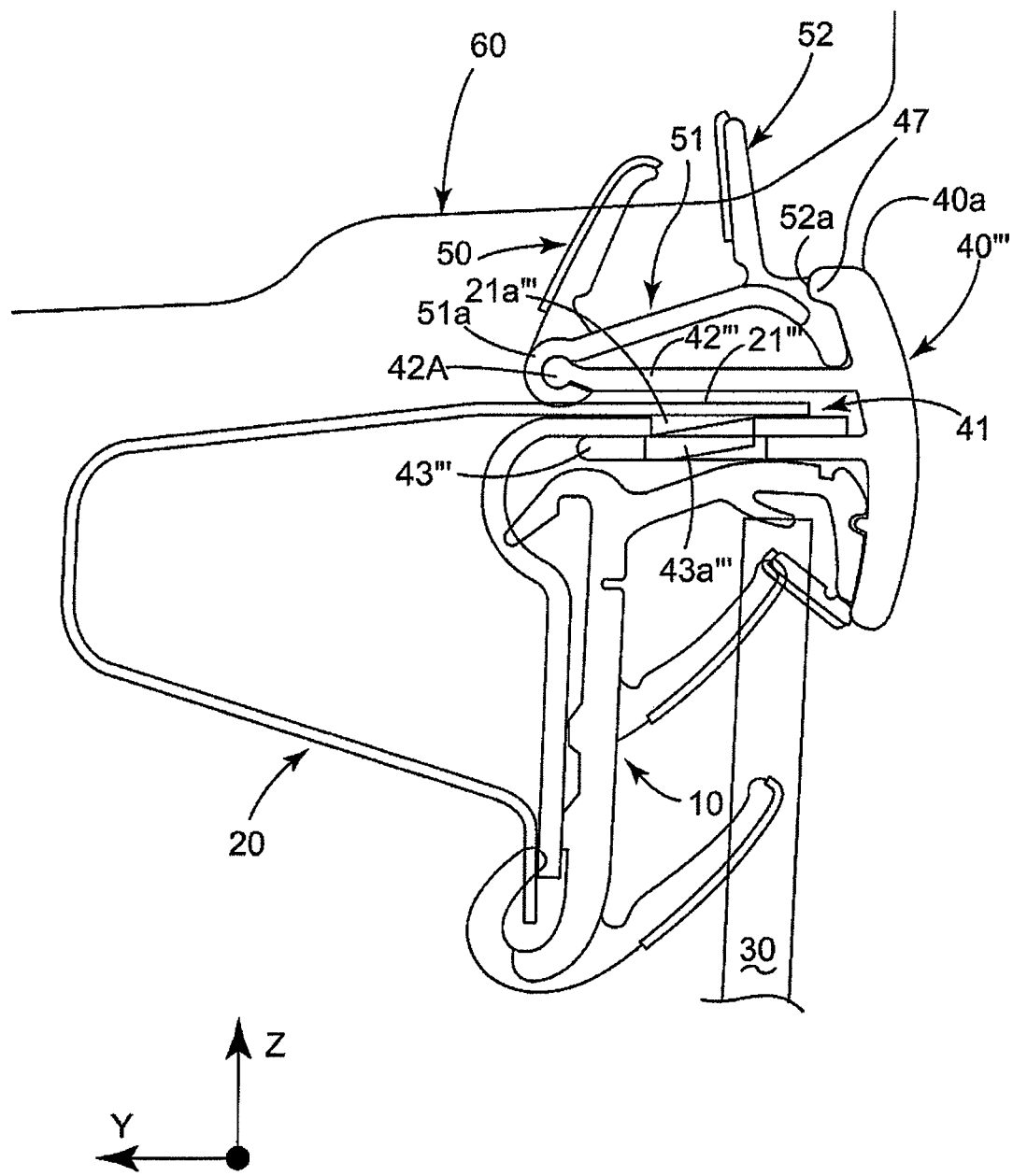
FIG. 4A is an enlarged view in cross section of the sealing module of FIG. 3B notably illustrating one example of mechanical securing of the double lip seal profile strip to the upper leg of the trim.
Figure 4B:
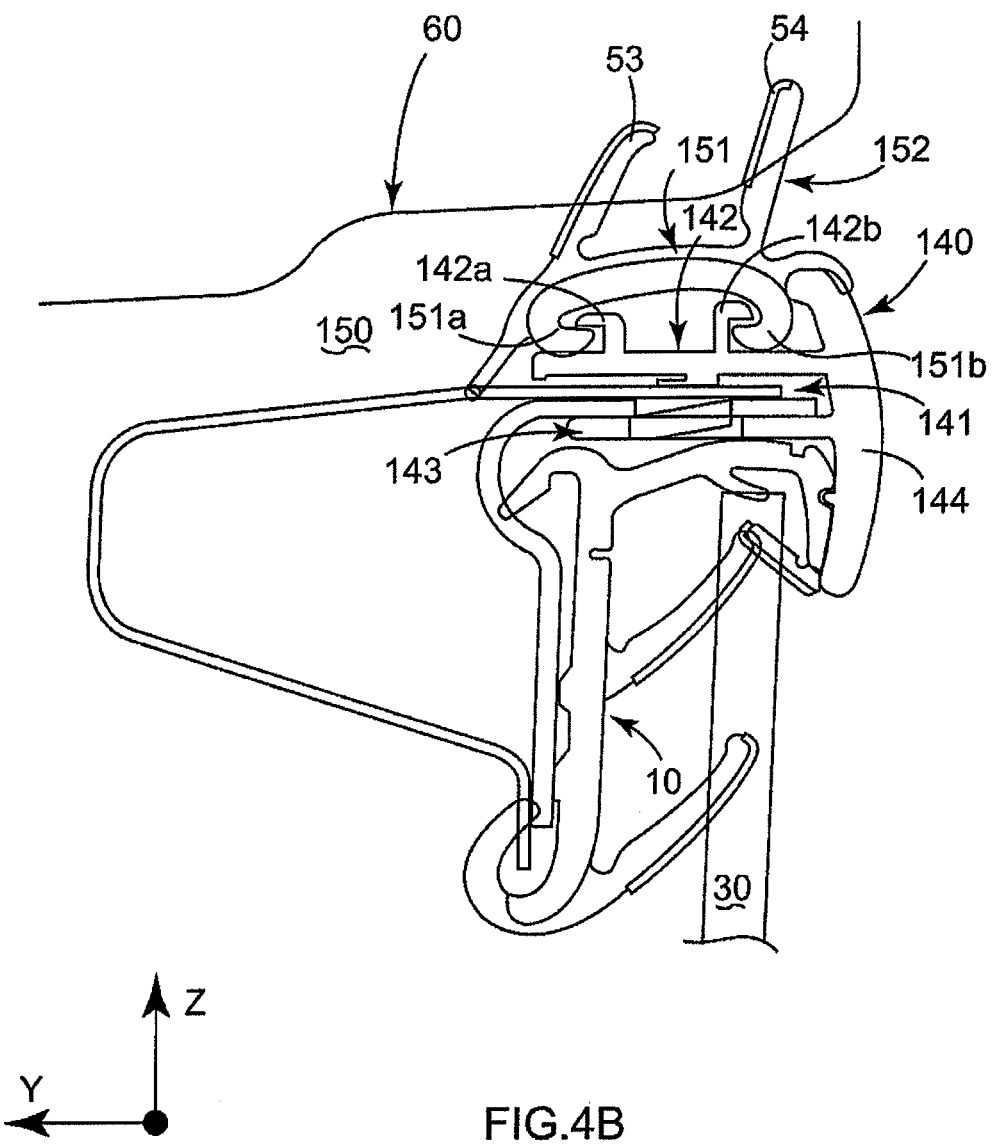
FIG. 4B is a view in cross section of a sealing module according to an alternative form of FIG. 4A illustrating another example of mechanical securing of the double lip seal profile strip to the upper leg of the trim.
Figure 4C:
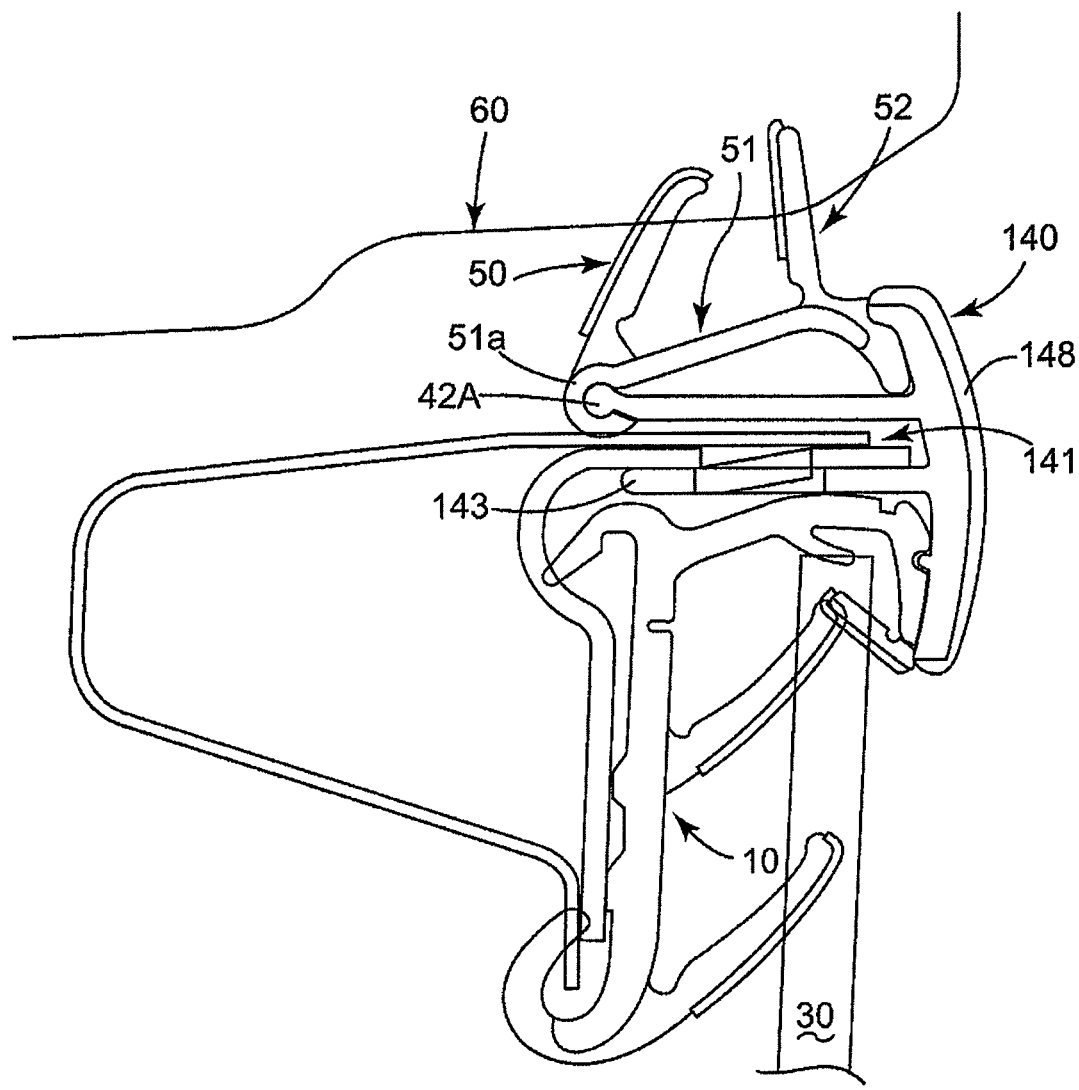
FIG. 4C is a view in cross section of a sealing module according to an alternative form of FIG. 4A, which differs therefrom only in that the fair face of the trim has a different structure.
Figure 4D:
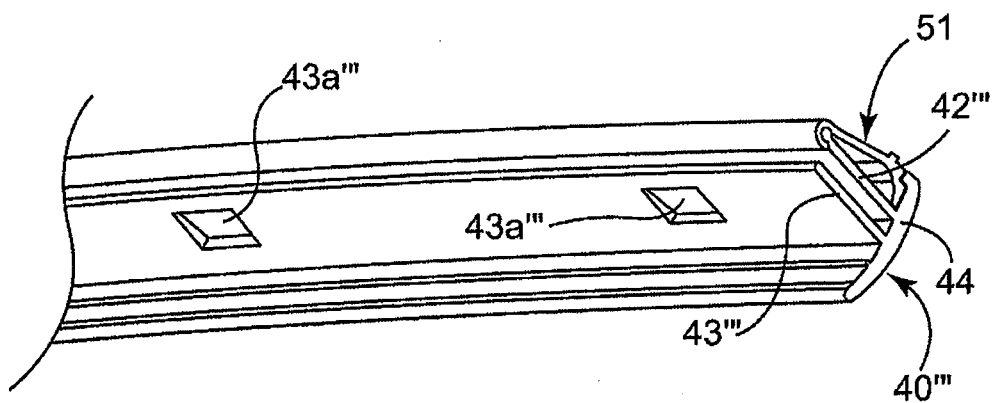
FIG. 4D is a partial view both in cross section and in perspective viewed from beneath, of a trim according to FIG. 4A, on which the double lip seal profile strip of this FIG. 4A (with the exception of the sealing part of this profile strip) is caught, this FIG. 4D notably showing the structure of tabs or "lancings" that protrude from the lower leg of the trim.
Figure 4E:
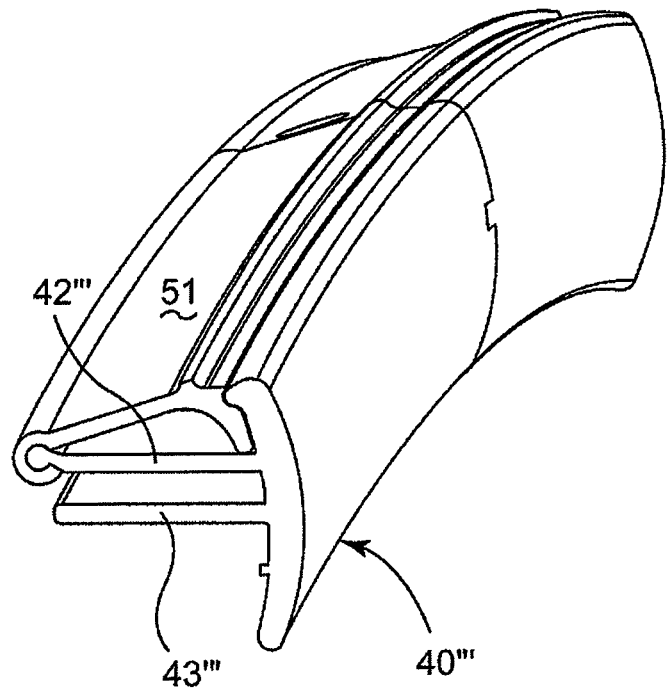
FIG. 4E is a partial view both in cross section and in perspective viewed from the side, of a trim according to FIG. 4D formed of several longitudinal sectors joined together.
Figure 5:
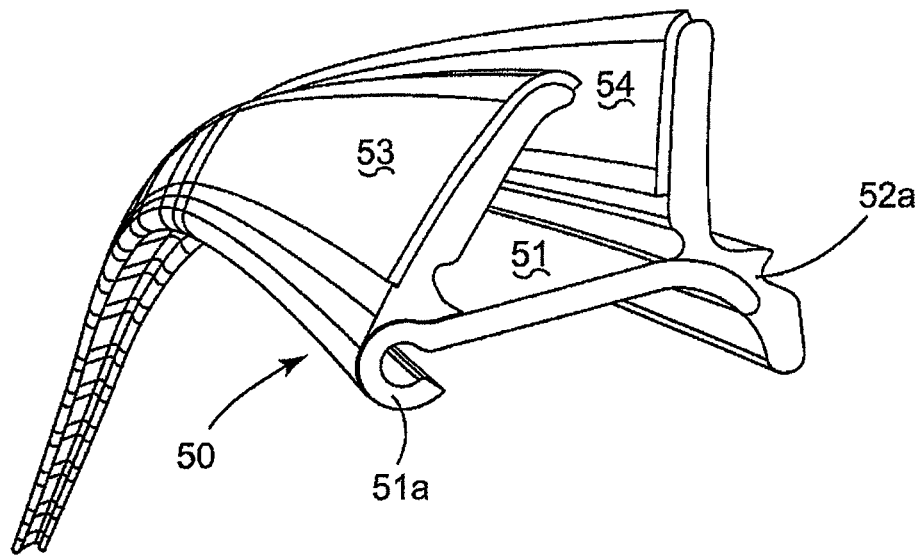
FIG. 5 is an enlarged view of just the double lip seal profile strip of FIGS. 4A, 4C, 4D and 4E, notably showing the multi-material structure of its rigid base and of its flexible sealing part.

Such tabs 43a''' formed in the manner of lancings are illustrated in FIG. 4D along this lower leg 43", with reference to FIG. 3B.

FIG. 4A details, likewise for this embodiment of FIG. 3B, one example of mechanical catching between the rigid base 51 of the double lip seal profile strip 50 and the upper leg 42" of the trim 40''', via the bulge-like axially internal end 42A of the leg 42" being hooked by the bent-back axially internal end 51a of the base 51, which extends obliquely toward the upper edge 40a of the trim 40" which thus presses axially against this double lip seal profile strip 50. This double lip seal profile strip 50 is further attached to the trim 40''' at a second catching region, directly on the back of the upper edge 40a, by a lug 47 protruding axially inward from this edge 40a into a housing 52a in the flexible part 52 of the profile strip 50, thus locking its position and its sealing contact on the trim 40'''.

The module according to the alternative form of FIG. 4B differs from that of FIG. 4A only in that the double lip seal profile strip 150 is secured to the upper leg 142 of the trim 140 by the double hooking or clipping in the vertical direction Z of two axially internal and external lugs 142a and 142b which extend at right angles from the upper face of the leg and then are bent back from one another forming substantially the shape of an overturned "π" in cross section, the hooking being performed by the axially internal and external ends 151a and 151b, which are bent back toward one another, of the base 151 (which is substantially in the shape of a "∩" or "Ω" in cross section).

Figure 6:
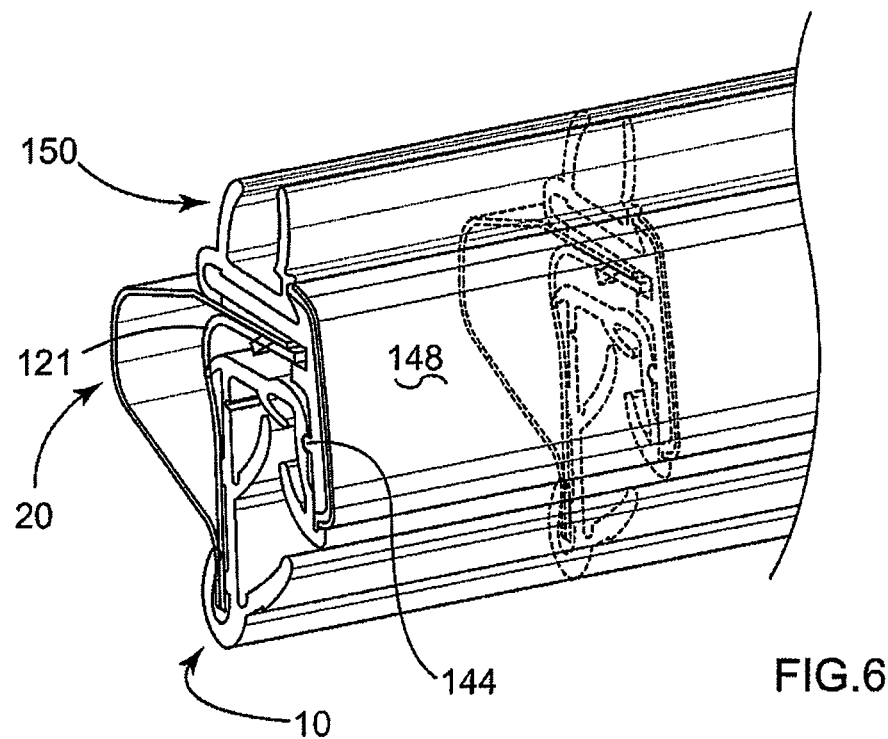
FIG. 6 is a partial view both in cross section and in perspective viewed slightly from the side, of a sealing module still according to said first embodiment but according to an alternative form of FIG. 3A which differs therefrom notably by the discontinuous staggered way in which the upper and lower legs of the trim are formed and by the fact that the double lip seal profile strip is mounted flat on this upper leg.
Figure 6A:
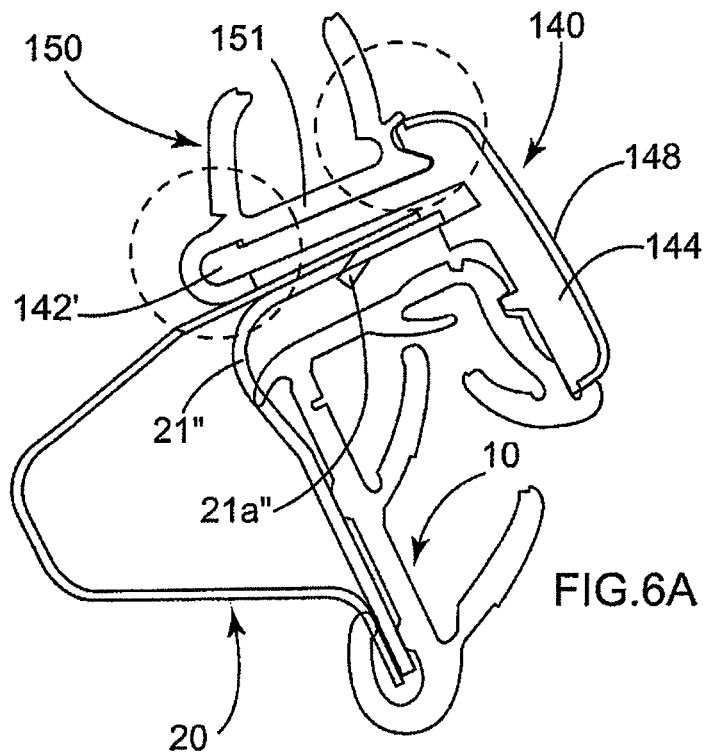
FIGS. 6A and 6B are views in cross section of two sealing modules according to this first embodiment of the invention, of the type of that of FIG. 6, notably showing this staggered arrangement of the two trim legs and the catching means and elements according to FIG. 3A in the case of FIG. 6A (perforated lower leg), and according to FIG. 2A in the case of FIG. 6B (perforated upper leg)

The double lip seal profile strip 50, 150 of a module according to the invention can be manufactured by extrusion (longitudinal cross section constant) or by single-shot or multiple-shot injection molding (i.e. notably by co-injection molding), injection molding allowing this profile strip 50, 150 to be given a shape that evolves over its length so that it is better able to follow the shape of the fixed frame 60 (bodyshell side) and of the trim 40 to 140 along the entire perimeter concerned. This double lip seal profile strip 50, 150, depending on its immediate surroundings, may have a shape as close as possible to the upper leg 42 to 142 of the trim 40 to 140 if there is very little space available (see FIGS. 6 to 6D), or on the other hand may be more distant from this leg 42 to 142 so that it gradually nears the wall on the bodyshell 60 side against which it is to seal (see FIGS. 4A and 4C). Its rigid base 51 to 151 may be based on an EPDM of high Shore D hardness, or on a polypropylene, for example containing fillers of talc, glass fiber or hemp, in percentages by mass ranging from 5% to 60% and preferably of between 20% and 30%. Its flexible part 52 to 152, whether of tube type or of the type with lips 53 and 54, may for example be made of a flexible EPDM of compact or cellular type, of a flexible TPE of the TPS type (e.g. SEBS) or flexible TPV (e.g. a mixture of polypropylene and EPDM) or alternatively a PVC, a styrene elastomer or a polyurethane, and this flexible part 52 may continue around the region 42A for catching on the trim 40''' (see FIG. 4A) in order to ensure a contact with the rebate 21''' which is free of vibration or parasitic noise. Of course, the materials of which the double lip seal profile strip 50, 150 is made are chosen with due deference to the mutual compatibilities of the materials. It is possible to incorporate a slippery coating, such as an adhesive, possibly a hot melt adhesive to which flock has been added, a flocked strip, a co-extruded film of HDPE (high density polyethylene) or of high hardness polypropylene, a lacquer, etc. As already mentioned, it will be noted that the double lip seal profile strip 50, 150 may be co-injection molded directly with the frame trim 40 to 140 in order to ensure that it is closely bonded therewith.

In general, with reference to the first embodiment of the invention, the two legs 42 to 142, 142' and 43 to 143, 143' of this clamping portion 41 to 141 may be longitudinally continuous, as may be seen in FIG. 4D, or alternatively, depending on the environment to which this portion must conform and for ease of production of the mold and ease of molding, they may be discontinuous and arranged in alternation along the length of the trim 40 to 140 (i.e. in a staggered configuration, see FIGS. 6 to 7B) so that over a given cross section, just one leg 42 or 43 to 142 or 143 cooperates by catching with the rebate 21 to 121. FIGS. 6, 6A, 6C and 6D in particular show the snap-fastening of a tab 21a" of the rebate 21" into a rectangular through-cavity 43a" of the discontinuous lower leg 143', above which the upper leg 142' is locally absent, as visible in FIGS. 7A and 7B which show this perforated structure of each portion of lower leg 143' and, by contrast, the solid structure of each portion of upper leg 142'.

Still regarding this clamping portion of the trim 40 to 140 it will be noted that its overall U shape can be broken down into local tightenings of the U so that it grips at isolated points and that thin longitudinal ribs can also be created inside this U to give the part stability once it has been fitted and prevent movements and therefore parasitic noises against the rebate of the frame 21 to 121. The entire contact between trim 40 to 140 and rebate 21 to 121 is mainly governed by the elastic deformation of the U of the clamping portion 41 to 141, which remains in contact with the sheet metal rebate 21 to 121 thanks to the stress of deformation.

The clamping portion 41 to 141 of a trim 40 to 140 according to the invention is made of a rigid material, possibly filled to give good thermal performance (resistance to thermal expansion and contraction observed after the thermal aging cycles contained in manufacturer specification sheets). This rigid material may, for example, be based on a polypropylene reinforced with talc at a mass percentage of 20% or by glass fiber at a mass percentage of 30%, or alternatively may be made of ABS (a terpolymer of acrylonitrile-butadiene-styrene), possibly mixed with a polycarbonate.

As for the bearing portion 44 to 144 of the trim 40 to 140, this may be rounded to respect the style and lines of the vehicle, visible from the outside and therefore having to have a satisfactory fair face 148. The module according to the alternative form of FIG. 4C differs from that of FIG. 4A only in terms of its fair face 148, its clamping portion 41 to 141 being unchanged.

This fair face 148 may be inherent to the material used to injection mold the trim 40 to 140 for shades such as full gloss black or matt black, in which case the bearing portion 44 to 144 may have a special material in a fine coat $1/10$ mm to 2 mm thick, such as a decorative polypropylene or a matt thermoplastic material elastomer (such as a mixture of polypropylene with EPDM, for example an SEBS).

According to a first alternative form, particularly for so-called "chrome" finishes, the chrome plated appearance can be obtained by a catalytic bath, something which is feasible only with certain categories of material: ABS, ABS mixed with a polypropylene, etc. In such cases the trim 40 to 140 may be fully injection molded in this material.

Figure 6B:
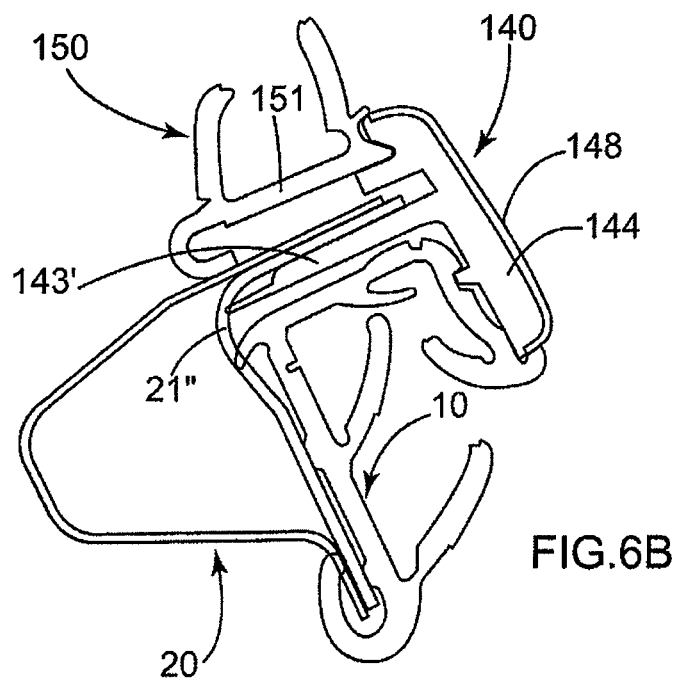
Figure 6C:
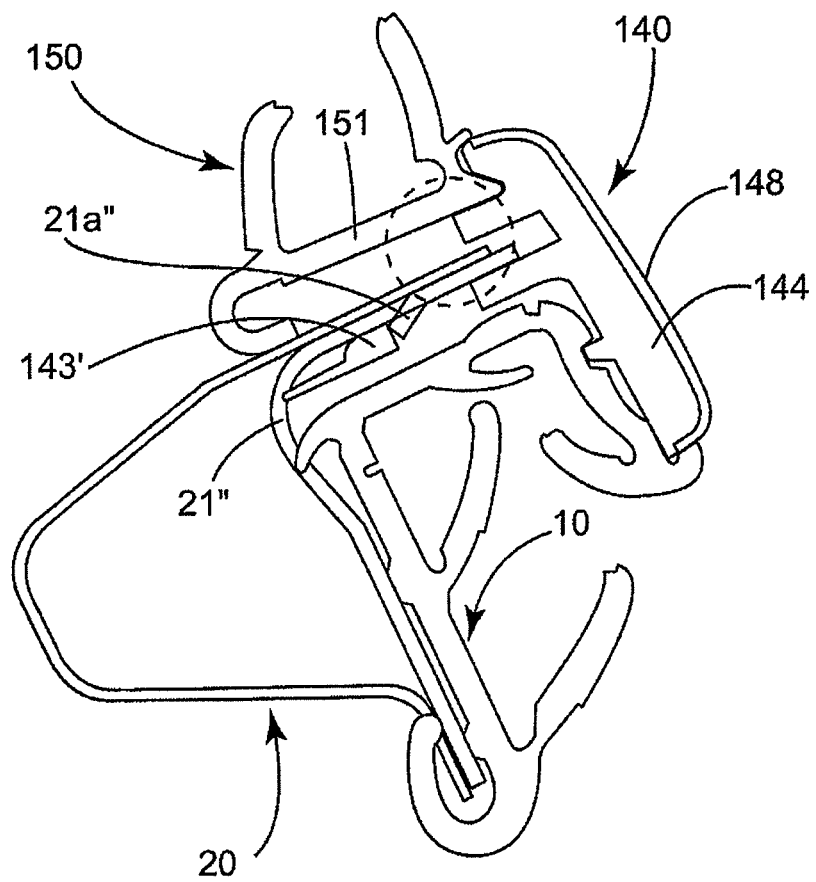
FIG. 6C is a view in cross section of a sealing module according to this first embodiment of the invention, essentially differing from that of FIG. 6A in that the fair face of the trim is formed of a decorative film or metal foil.
Figure 6D:
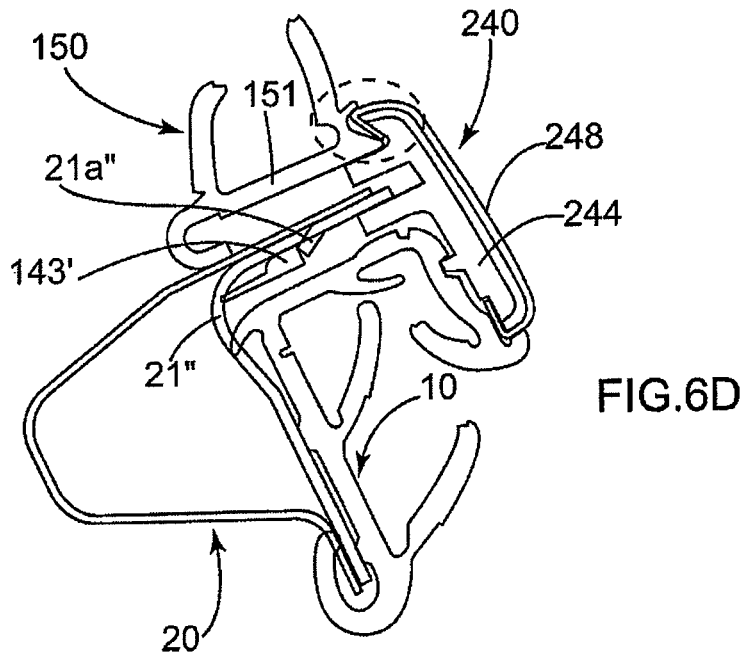
FIG. 6D is a view in cross section of a sealing module according to this first embodiment of the invention, showing an alternative form of FIG. 6C in which this film or foil is bonded or crimped onto this fair face and onto the bent-back ends thereof.
Figure 7A:
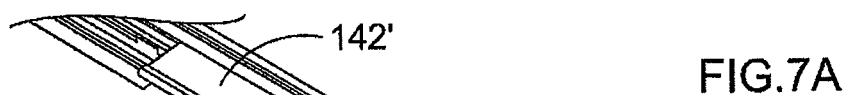
FIG. 7A is a partial perspective view showing one example of a discontinuous staggered structure of the two legs of the trim according to FIGS. 6 to 6C, with the catching cavities formed on its lower leg.
Figure 7B:
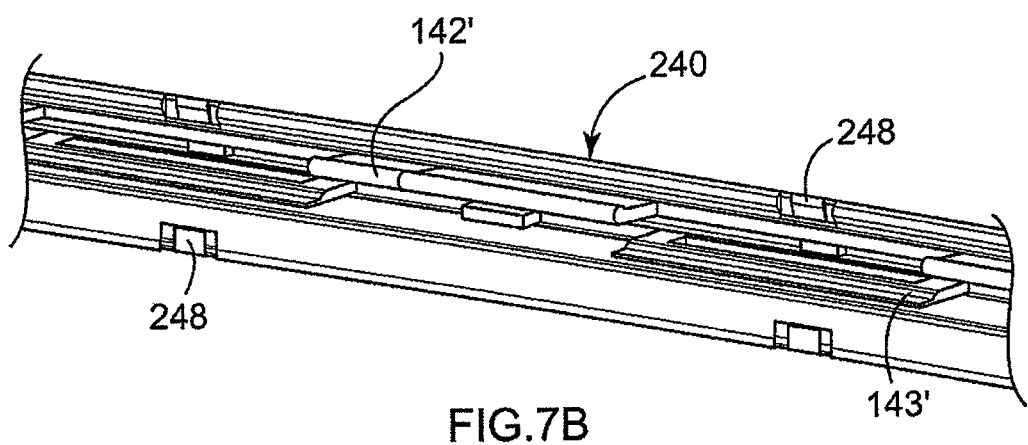
FIG. 7B is a partial perspective view showing another example of a trim according to FIG. 6D, supplementing the discontinuous structure of the legs according to FIG. 7A with the localized crimping at bent-back portions of the foil of this FIG. 6D.

According to a second alternative form, in order to obtain the chrome plated appearance, full gloss black appearance or any other color or pattern, a bearing portion 144 receives a thin decorative band 148 of chrome or of the desired color or pattern. This band may either be a decorative film that already exists on the market (see FIGS. 6A to 6C) or may be a $5/10$ mm stainless steel or aluminum metal foil. According to the embodiment, this film or this foil 148 may be:

added on to the bearing portion 144 after the latter has been injection molded (by fusion, bonding, or even crimping as illustrated in FIGS. 6D and 7B), or alternatively incorporated into the mold at the time of the injection-molding of the trim 140, thus achieving a chemical bond (see FIG. 6C: film with a base compatible with the injection molded material, such as a polypropylene, or metal foil with primer) or a physical bond (see FIGS. 6D and 7B: the metal foil 248 has upper and lower edges which are bent back toward one another and cavities that the injection-molded material will occupy).

To do this, and in particular in order to follow the curvature of the trim 140, 240, this thin decorative band 148, 248 has been either cut to shape to follow this curvature, or bent prior to its attachment to the bearing portion 144, 244 or in the mold, or it naturally has enough flexibility to conform to this curvature without any previous shaping.

By way of film 148 it is possible, for example, to use a film of a chromium plated or full gloss black appearance inside the mold, or a surface treatment (for example graining).

When use is being made of a foil 148, 248, it may also be attached using bonding or mechanical clamping either continuously or discontinuously (at localized points). This foil 148, 248 is in the overall shape of a C associated with grooves on its bearing portion 144, 244 for mounting. The trim 140, 240 may also locally comprise mugs which are closed over onto the trim for attachment purposes. It will be noted that this added-on foil 148, 248 can be painted or covered with a film to give an appearance other than chrome plated and that the decorative foil 148, 248 may also be extruded in the aluminum version, which allows solutions for attachment to the trim 140, 240 using shapes other than a C shape. In general, it is possible to use a thin foil 148, 248 in aluminum or in stainless steel (which has been pressed or extruded) in the mold or even added on by mechanical fastening or bonding.

It will also be noted that it is possible to incorporate the flocking of the trim 40 to 240 either:

in the mold, via a flocked band positioned in this mold, or alternatively on leaving the mold, using a band which is added on or applied using known methods (i.e. adhesive or possible hotmelt+flock).

It will also be noted that it is possible to replace the flock with a material with a low coefficient of friction, which can either be:

incorporated into the mold in the form of a slippery film of HDPE type, by injecting or spraying into the mold a fine coat of slippery material (a lacquer or slippery polypropylene or alternatively a slippery TPE), or alternatively added on in a subsequent operation (spraying or HDPE band, for example).

Figure 8:
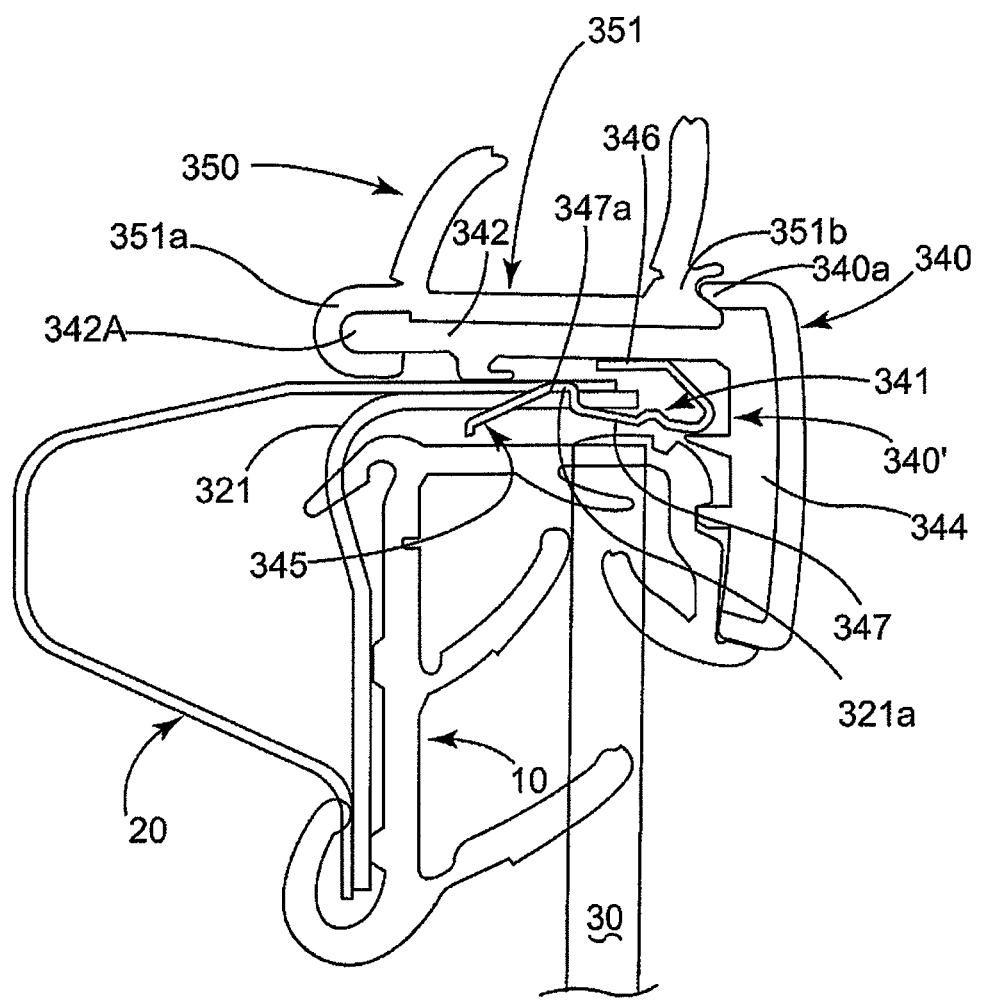
FIG. 8 is a view in cross section of a sealing module according to the second embodiment of the invention, showing a clip which is immobilized inside a trim body and the lower branch of which forms the lower leg of the trim by catching in a cavity of the rebate, the fair face of the trim being formed by a film or foil of the type of FIGS. 6A to 6C and this module incorporating a double lip seal profile strip mounted flat along the upper leg of the trim after the example of FIGS. 6 to 6D.
Figure 8A:
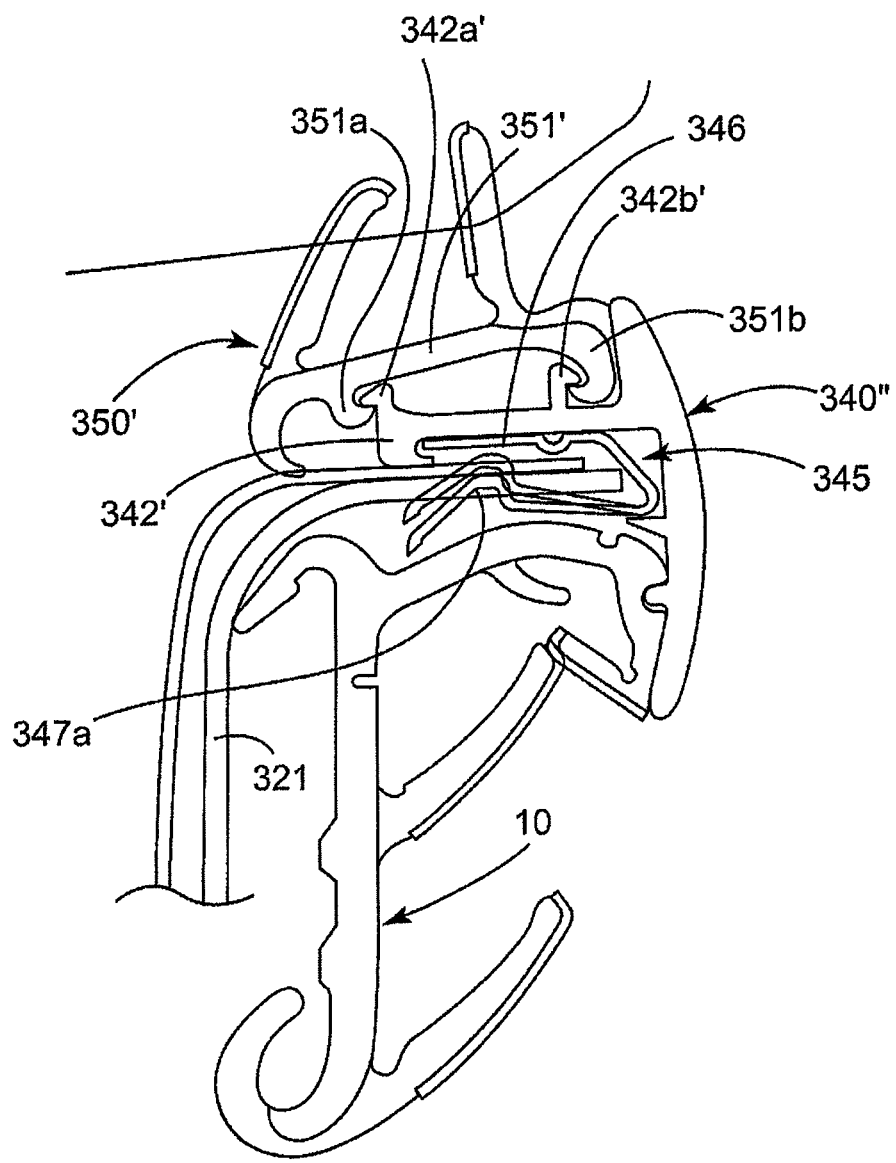
FIG. 8A is a view in cross section of a sealing module according to the second embodiment of the invention, according to an alternative form of FIG. 8 in which the upper leg of the trim accepts the double lip seal profile strip spaced apart from it after the example of FIG. 4B, the lower branch of the clip here being mounted in two positions, these respectively being outside of and in this cavity of the rebate.
Figure 8B:
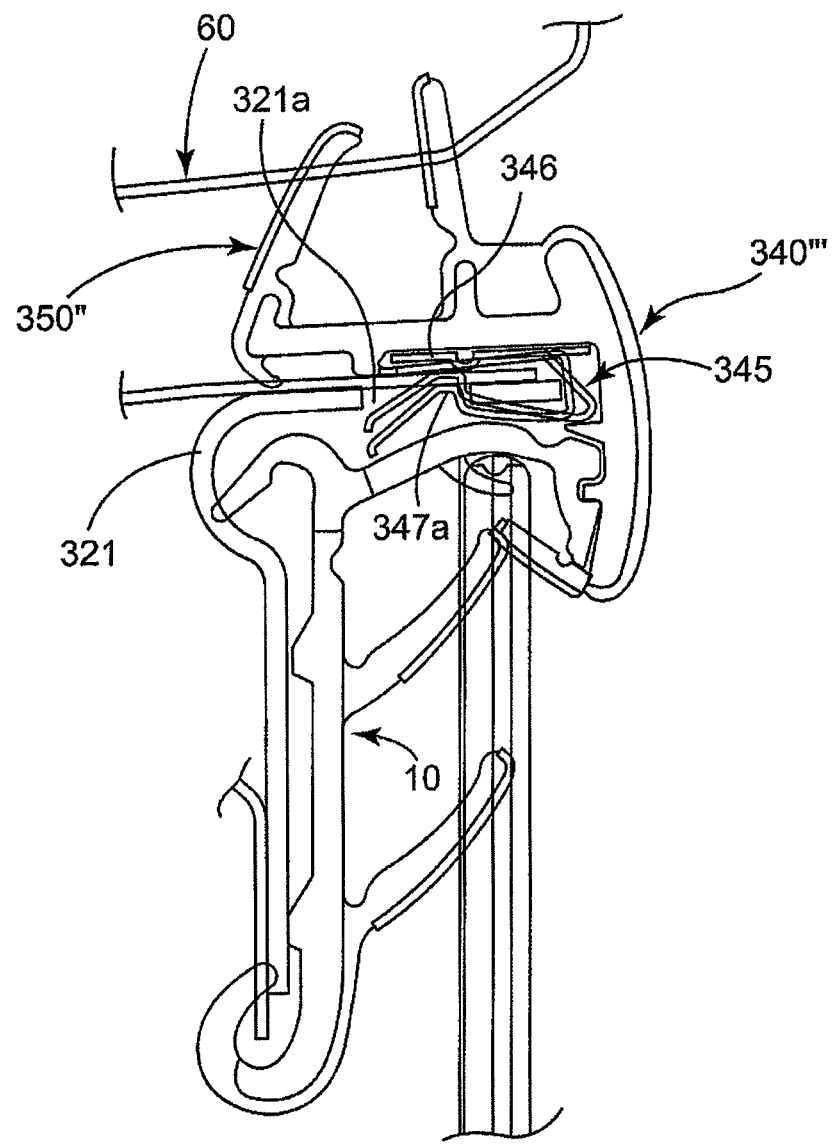
FIG. 8B is a view in cross section of a sealing module according to the second embodiment of the invention in accordance with another alternative form of FIG. 8 in which the double lip seal profile strip is formed as a single piece with the trim, for example by co-injection molding or multi-shot injection molding, a lower branch of the clip also being shown in said two positions.
Figure 8C:
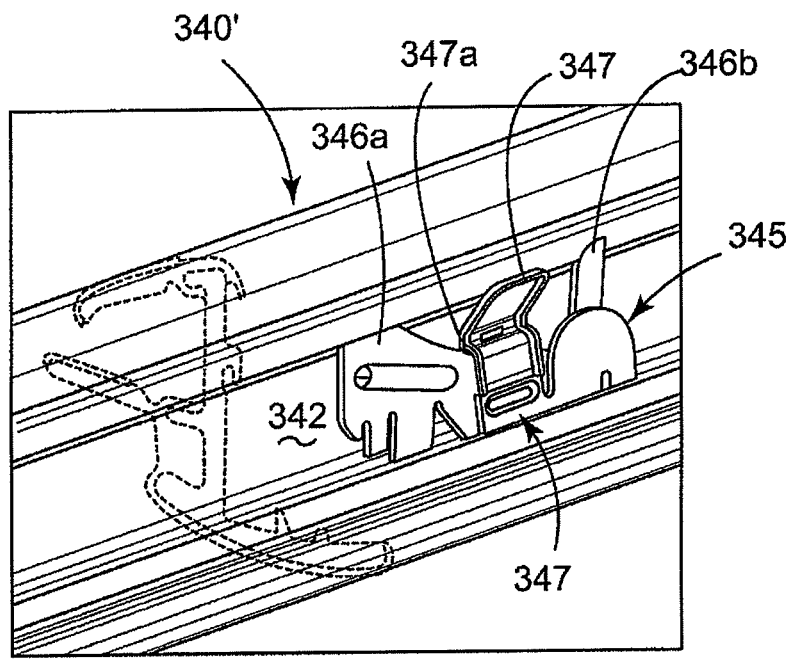
FIG. 8C is a perspective view of a trim of the type of that of FIG. 8, in which a clip according to FIGS. 8 to 8B is mounted.
Figure 8D:
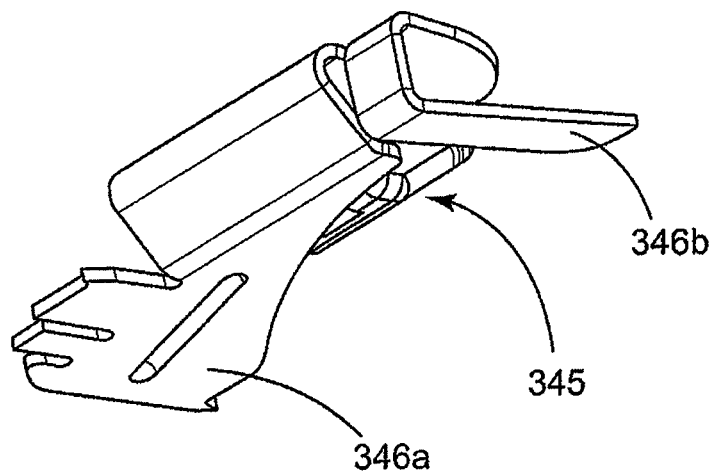
FIG. 8D is a perspective view of this clip according to FIGS. 8 to 8C.

In the second embodiment of the invention which is illustrated in FIGS. 8 to 8D, the frame trim 340, which is injection molded in thermoplastic material(s) may be in the overall shape of a L in cross section and comprises: comprises:

an external trim body 340' having a bearing portion 344 which forms the base of the L and which is intended to hold in position the run channel profile strip 10 and double lip seal profile strip 350, and a single leg 342 intended to accept this double lip seal profile strip 350, and a plurality of plastic or metal clips 345 which are mounted in abutment spaced apart inside the trim body 340' along its length and which have an upper branch 346 and a lower branch 347 defining a clamp for clamping onto the rebate 321 (this clamp is fitted onto this rebate in the axial Y direction of the vehicle), the lower branch 347—or catching leg of the trim 340—having a protruding catching part 347a which is curved in toward the leg 342 and is intended to become wedged in a through-cavity 321 a of the rebate 321.

FIGS. 8, 8C and 8D show that the lower branch 347 of each clip 345 forms, in relation with the leg 342 of the trim body 340', the clamping portion 341 of the trim 340 and that the upper branch 346 of each clip 345 defines a holding region 346a and 346b holding the clip in abutment in the trim body 340', this holding region 346a and 346b being substantially parallel to the leg 342.

These figures also show that the trim 340, 340", 340''' is provided with a double lip seal profile strip 350, 350', 350" which is possibly formed as a single piece by co-injection molding (see FIG. 8B) and which allows the run channel profile strip 10 to be held in association with the door frame 320.

After the manner of what has been explained hereinabove in respect of the first embodiment of the invention, the attachment of this double lip seals profile strip 350, 350' to the trim 340, 340", 340''' can be achieved via mechanical catching, via:
the hooking of the bulge-shaped axially internal end 342A of the leg 342 by the bent-back axially internal end 351a of the base 351 of the profile strip 350 and by the wedging of the upper edge 340a of the bearing portion 344 against the axially external end 351b of this profile strip 350 (see FIG. 8); or alternatively via
the double hooking of two lugs 342a' and 342b' of the leg 342', which are analogous to the lugs 142a and 142b of FIG. 4B, by the axially internal and external ends 351a and 351b, which are bent back toward one another, of the rigid base 351' of the double lip seal profile strip 350' (see FIG. 8A).

FIGS. 8C and 8D show an example of a geometry that can be used for these clips 345, with notably the holding portion 346 having two opposing ends 346a and 346b which become wedged behind an upper rim of the body of the trim 340', and the clamp the lower branch 347 of which is bent successively toward this holding portion 346 (in its catching part 347a) and then away therefrom.

It will be noted that the clips 345 can be bonded to the leg 342 of the trim 340 to improve their hold, or alternatively may be welded to this leg 342 (in the case of plastic clips). As an alternative, these clips 345 may be placed in the mold used for injection molding the trim 340 (they then need to have a region that will allow for mechanical catching of the injected material).

Figure 9:
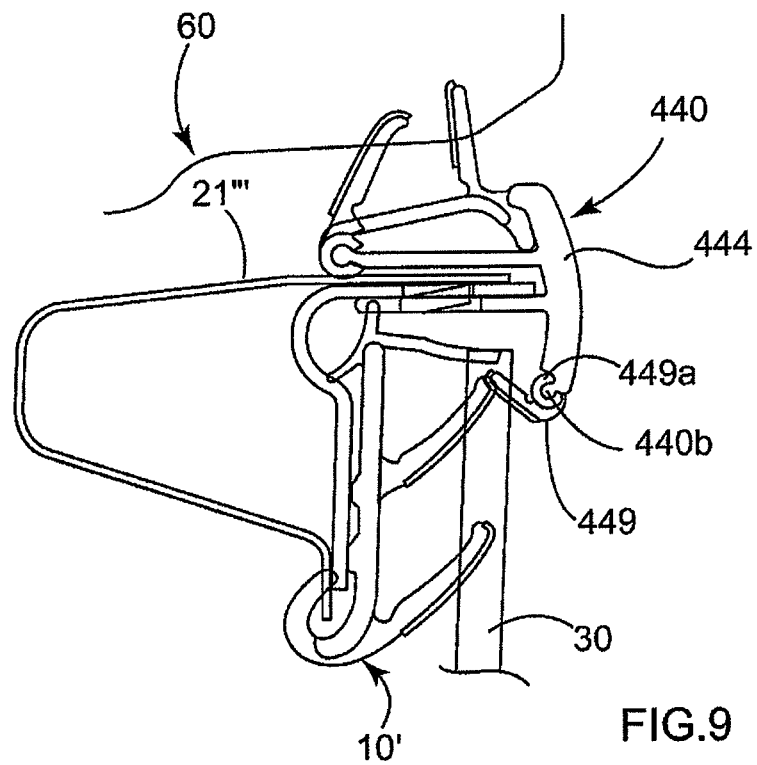
FIG. 9 is view in cross section of a sealing module according to the first embodiment of the invention in accordance with an alternative form of FIG. 3B, which shows the catching of a sealing lip associated with the glass run channel profile strip on the trim.
Figure 10:
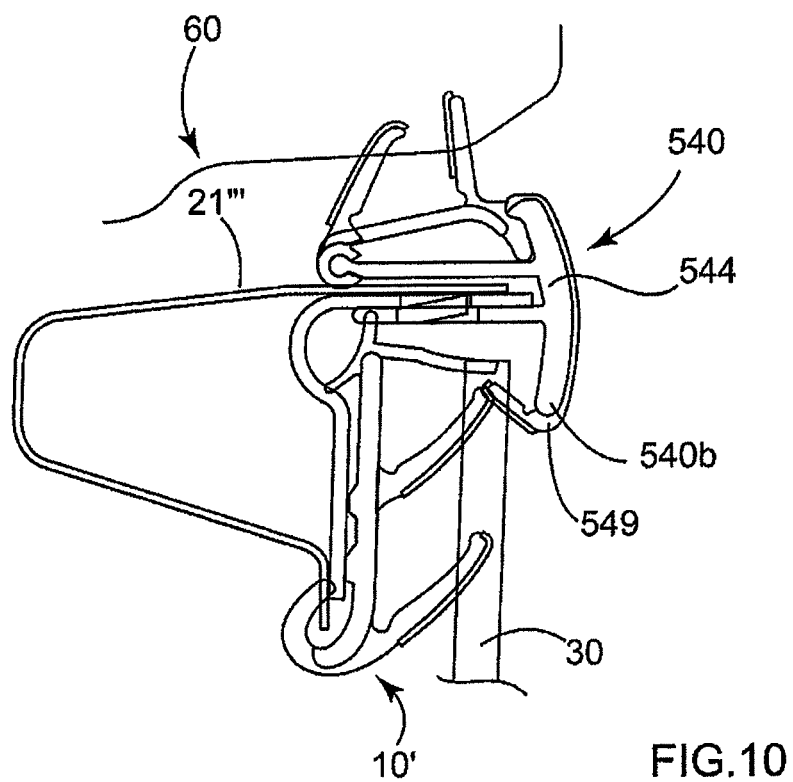
FIG. 10 is a view in cross section of a sealing module according to the first embodiment of the invention in accordance with an alternative form of FIG. 9, which shows the formation of a sealing lip associated with the glass run channel profile strip as a single piece with the trim.

As illustrated in FIGS. 9 and 10, the trim 440, 540 may be directly provided with at least one sealing profile strip or lip 449, 549 to be pressed against the external face of the glazing 30, in combination with a run channel profile strip 10' also mounted on the rebate 21''' (analogous in this example to that of FIG. 4A) pressing against the other side of the glazing 30.

In the example of FIG. 9, the bearing portion 444 of the trim 440 has a protruding lower edge 440b on which such an extruded or injection-molded sealing lip 449 is caught via a C-shaped catching region 449a of the lip cooperating with this protruding edge 440b which in this example is of the ball or bulge type.

In the example of FIG. 10, the bearing portion 544 of the trim 540 has a lower edge 540b to which there is attached, as a single piece, such a sealing lip 549 which is preferably molded with the trim 540 by overmolding or co-injection molding.

The invention claimed is:

1. Exterior trim for a frame of a glazed side or rear door of a motor vehicle, wherein
    the trim is configured to attach directly to a rebate of the frame and is configured to hold onto the frame at least one sealing profile strip of a glass run channel type and a double lip seal for sealing against a bodyshell of the frame;
    the trim comprising a substantially U-shaped clamping portion with two longitudinal axial legs for clamping onto the rebate, wherein a plurality of male catching means, female catching means or male and female catching means are:
    formed spaced along the length of at least one of the legs, the plurality of catching means facing the other leg and are
    configured to cooperate respectively with a plurality of complementary female catching elements, male catching elements or male and female catching elements, formed spaced along the length of said rebate,
    wherein the two legs are both discontinuous over the length of the trim and are formed of a plurality of leg sectors arranged in a staggered configuration of the two legs, each of the leg sectors having one of the catching means.

2. Trim according to claim 1, wherein the catching means comprise parts protruding toward the other leg, recessed or hollowed parts, or both protruding parts and hollowed or recessed parts, and wherein
    the catching means are formed short of an axially inner free end of the catching leg.

3. Trim according to claim 1, wherein the trim comprises an axially outer bearing portion comprising a web of the U-shaped clamping portion and extending it at least on one of its sides, or glass run channel side, wherein
    the trim is configured to bear against the glass run channel profile strip.

4. Trim according to claim 3, wherein the bearing portion further extends the web on an opposite side to the glass rim channel side, or double lip seal side, and wherein
    the trim is configured to bear against the double lip seal profile strip, the trim having substantially the shape of a "π" in cross section.

5. Trim according to claim 3, wherein the bearing portion and at least the other leg are single-shot or multi-shot injection molded from one or more thermoplastic materials chosen from the group consisting of filled materials based on thermoplastic material polymers, thermoplastic material elastomers (TPEs) and mixtures thereof.

6. Trim according to claim 5, wherein the bearing portion has an axially outer fair face consisting of at least one layer of a film or of a metal foil, or is formed as one piece with the bearing portion by overmolding or multi-shot injection molding.

7. Trim according to claim 1, wherein the trim is molded by single-shot or multi-shot injection molding with one or more thermoplastic materials which form the catching leg, the other leg and an axially outer bearing portion joining them together, wherein the trim is formed as one piece over a given cross section.

8. Trim according to claim 7, wherein the catching means comprise a plurality of obliquely protruding tabs, which are formed spaced apart over the face of the catching leg facing the other leg and which are respectively configured to cooperate by snap-fastening with cavities of the rebate forming the catching elements.

9. Trim according to claim 7, wherein the catching means comprise a plurality of cavities, formed spaced apart through the catching leg and which are configured to be filled by snap-fastening by obliquely protruding tabs forming the catching elements on the opposing face of the rebate.

10. Trim according to claim 1, wherein the trim has a protruding lower edge on which is caught at least one extruded or injection-molding sealing lip configured to press against a glazing of the door, via a C-shaped catching region of the at least one lip cooperating with the protruding edge which is, of the ball, bull-nose or harpoon type.

11. Trim according to claim 1, wherein the trim has a lower edge to which there is attached as a single piece at least one sealing lip configured to press against a glazing of the door.

12. Sealing module comprising:
an exterior trim for the frame of a glazed side or rear door of a motor vehicle, the trim is configured to attach directly to a rebate of the frame and is configured to hold on to the frame by at least one sealing profile strip of the glass run channel type, and
the rebate which comprises the plurality of female catching elements or male catching elements or male and female catching elements, the plurality of catching elements is formed spaced along the length the rebate and is configured to cooperate with the plurality of complementary male catching means or female catching means or male and female catching means, the plurality of catching means is formed along the length of the at least one catching leg,
wherein the trim is as defined in claim 1.

13. Sealing module according to claim 12, of the type further comprising a double lip seal profile strip comprising a rigid base which is configured to be in contact with the trim, and a sealing part, which is configured to seal against the fixed frame of the bodyshell of the frame,
wherein the double lip seal profile strip is secured to the trim by at least one region of mechanical attachment or of adhesion between the rigid base and the one of the legs, or proximal leg, which is adjacent to the base.

14. Sealing module according to claim 13, wherein the mechanical catching region is formed at the respective axially internal ends of the rigid base and of the proximal leg and is formed by the bent-back axially internal end of the base which catches on a relief.

15. Sealing module according to claim 13, wherein the double lip seal profile strip is secured to the trim at two mechanical catching regions respectively formed by two axially internal and external lugs which are continuous or discontinuous,
wherein the lugs extend substantially at right angles from that face of the proximal leg which faces toward the profile strip and bent back away from one another so that the leg equipped with the lugs substantially forms an inverted "π" in cross section,
and wherein the two lugs are caught by the axially internal and external ends, which are bent toward one another, of the rigid base which is substantially in the shape of a "∩" in cross section.

16. Sealing module according to claim 13, wherein the double lip seal profile strip is secured to the trim by an adhesive bond.

17. Sealing module according to claim 13, wherein the rigid base of the double lip seal profile strip rests substantially flat against the proximal leg of the trim, or diverges progressively from the leg starting from its axially internal end as far as its axially external end, against which the trim is mounted.

* * * * *